United States Patent [19]

Foster et al.

[11] Patent Number: 5,253,792
[45] Date of Patent: Oct. 19, 1993

[54] LUGGAGE CARRIER WITH POP-UP FRAME

[75] Inventors: Jerald J. Foster, Milford; Craig A. Stapleton, Port Huron; Curtis J. Nordin, Port Huron; Mark C. Towns, Port Huron, all of Mich.

[73] Assignee: Huron/St. Clair Incorporated, Port Huron, Mich.

[21] Appl. No.: 850,186

[22] Filed: Mar. 11, 1992

Related U.S. Application Data

[62] Division of Ser. No. 728,868, Jul. 11, 1991, Pat. No. 5,096,106.

[51] Int. Cl.$^5$ ............................................. B60R 9/00
[52] U.S. Cl. .................................. 224/321; 224/316; 224/309
[58] Field of Search ............... 224/309, 314, 315, 316, 224/321, 325, 326; 16/348, 349, 351, 350

[56] References Cited

U.S. PATENT DOCUMENTS 1,060,641   5/1913   Sladden ................................. 16/349
3,165,353   1/1965   Weise ................................... 224/309
4,295,588  10/1981   Kowalski et al. ..................... 224/321

FOREIGN PATENT DOCUMENTS 450002   7/1936   United Kingdom ................. 224/314

Primary Examiner—Linda J. Sholl
Attorney, Agent, or Firm—Edgar A. Zarins; Malcolm L. Sutherland

[57] ABSTRACT

A luggage carrier for a vehicle having a frame which is adjustable between an elevated position spaced apart from the vehicle surface and a stored position substantially flush with the vehicle surface. The carrier frame can be moved to the stored position when not in use thereby reducing aerodynamic drag and improving the aesthetics of the vehicle. The frame is connected to a series of pivotable stanchions extending from base members mounted to the vehicle surface. The support stanchions incorporate locking assemblies which locks the frame in either position. As the support stanchions are pivoted into their respective base members, the frame will pivot downwardly until flush with the vehicle surface.

6 Claims, 5 Drawing Sheets

LUGGAGE CARRIER WITH POP-UP FRAME

This is a divisional of copending application(s) Ser. No. 07/728,868, filed on Jul. 11, 1991, now U.S. Pat. No. 5,096,106.

BACKGROUND OF THE INVENTION

I. Field of the Invention

This invention relates to article carriers for vehicles and, in particular, to a luggage carrier for a vehicle which incorporates a frame adjustable between an elevated position for retaining luggage and a stored position substantially flush with the vehicle surface.

II. Description of the Prior Art

Carriers have been used on vehicles to facilitate the transport of loads which cannot or are desired not to be transported within the vehicle. Generally, past known article carriers include a load-bearing surface formed by a supported rack or a series of slats mounted to the vehicle and a peripheral frame to retain the load on the load-bearing surface and facilitate tie-down of the load. The load retaining frame may merely consist of a pair of cross rails or a rectangular frame with cross rails and side rails. Normally, the frame is supported in spaced apart relation to the vehicle surface by stanchions mounted to the vehicle. Accordingly, the frame is positioned above the vehicle surface even when the carrier is not being used creating unnecessary drag and detracting from the appearance of the vehicle.

In an attempt to improve the aerodynamics and aesthetics of the unused article carrier, removable and slidably adjustable frame members were incorporated into carriers. The cross rails or the entire frame may include means for detaching the carrier from the vehicle. Such assemblies are generally stored separate from the vehicle, such as in a garage, and therefore may be unavailable for an unanticipated use. The slidingly adjustable carriers employ a side track along which the support stanchion will travel to accommodate different load configurations or for storage of the rails. This type of adjustable frame usually includes a pair of cross rails which can be nested together at the rear of the vehicle to form a spoiler. However, because the cross rails must be allowed to come together, the frame will not include side rails which may result in lateral shifting of the load.

SUMMARY OF THE PRESENT INVENTION

The present invention overcomes the disadvantages of the prior known vehicle article carriers by providing a carrier having a frame which is pivotably adjustable between an elevated position and a stored position.

The pop-up carrier of the present invention generally comprises a rectangular frame having a pair of side rails and cross rails extending between the side rails. A plurality of longitudinal slats may be affixed to the vehicle surface to form a load-bearing surface within the periphery of the frame. The frame is connected to the vehicle surface by a series of support stanchions comprising pivotable arms connected to a stanchion base mounted to the vehicle surface. The support stanchion includes means for locking the pivot arm and frame in either the stored or elevated position. The base members include recesses to receive the pivot arm and associated portion of the frame to create a flush aerodynamic assembly when the frame is in the stored position. Accordingly, the frame of the vehicle luggage carrier may be adjusted between a stored position during non-use which enhances the aerodynamics of the vehicle and an elevated position to retain loads positioned within the carrier.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
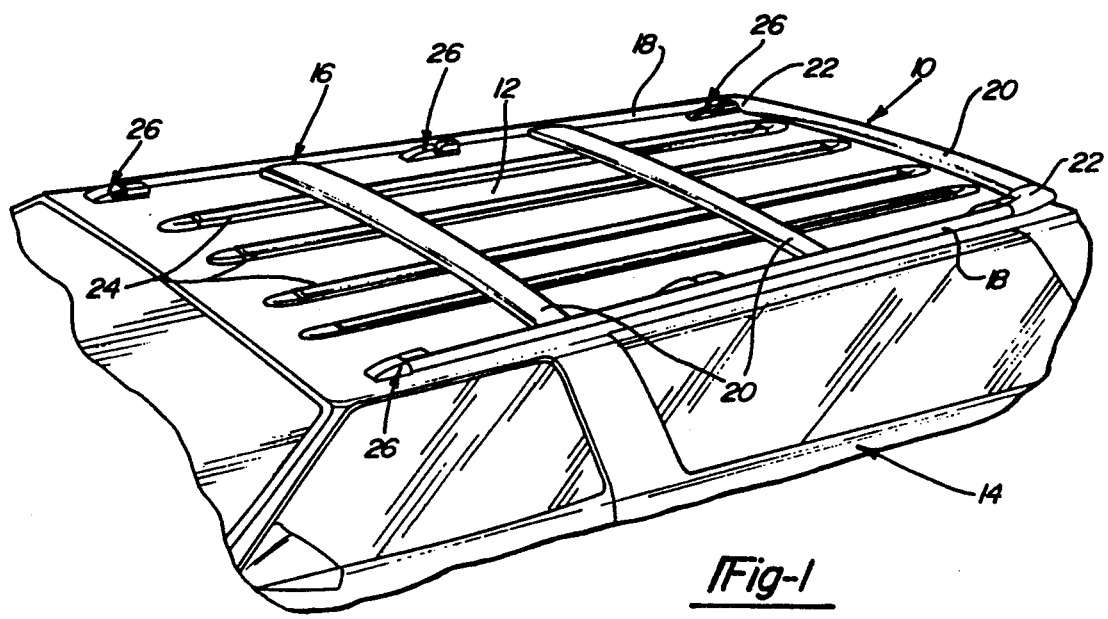
FIG. 1 is an elevated perspective of a first embodiment of the vehicle luggage carrier in the stored position.
Figure 2:
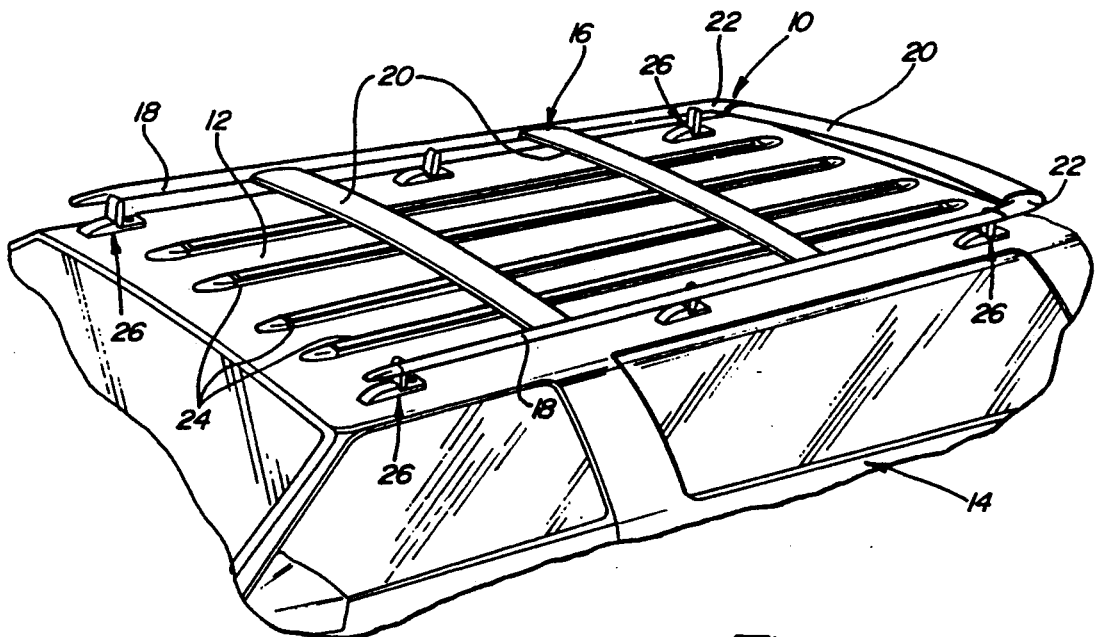
FIG. 2 is an elevated perspective of the vehicle luggage carrier in the elevated position.
Figures 7, 8:
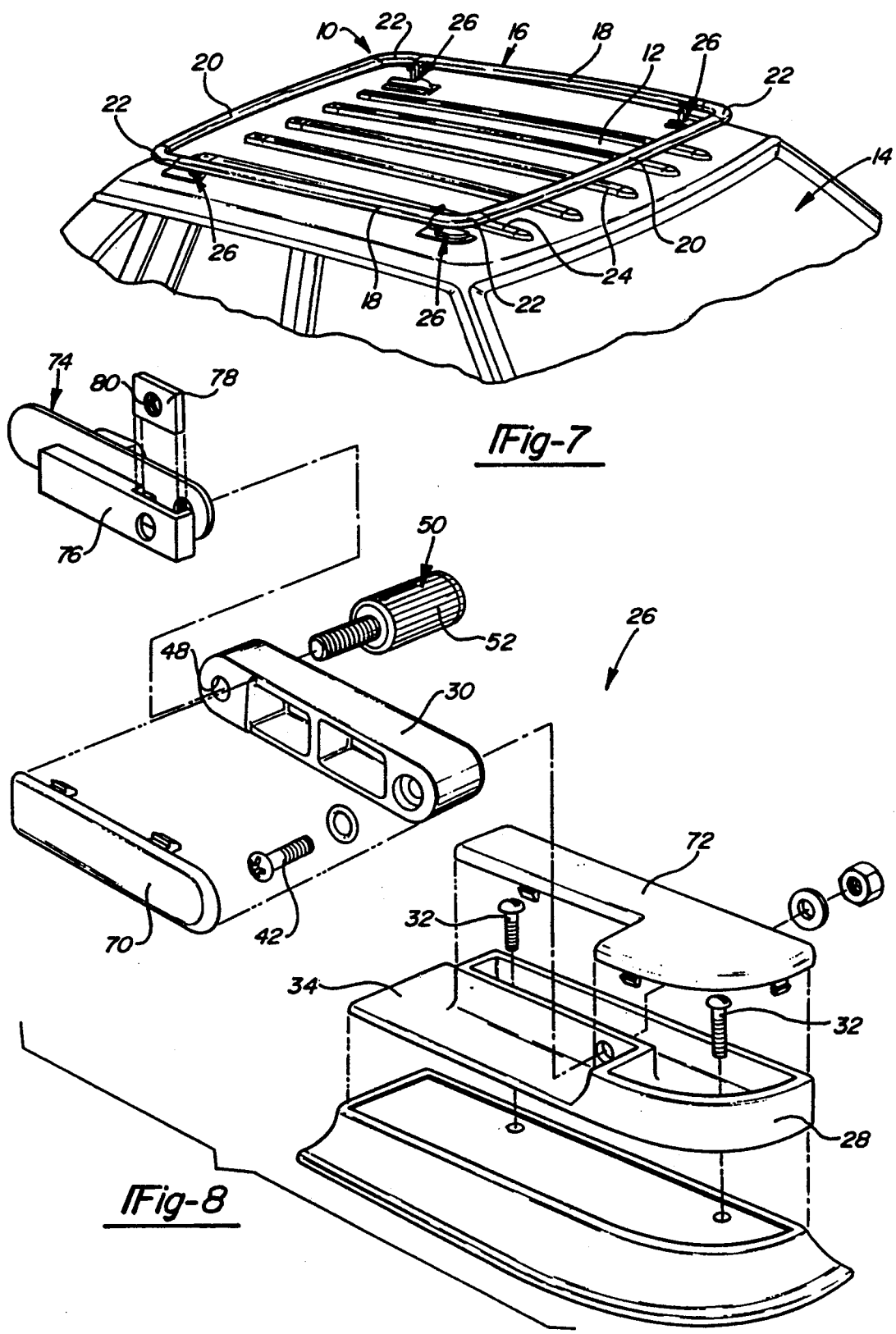
FIG. 7 is an elevated perspective of a second embodiment of the vehicle luggage carrier in the elevated position.
FIG. 8 is an exploded perspective of the support stanchion assembly of a second embodiment.
Figure 9:
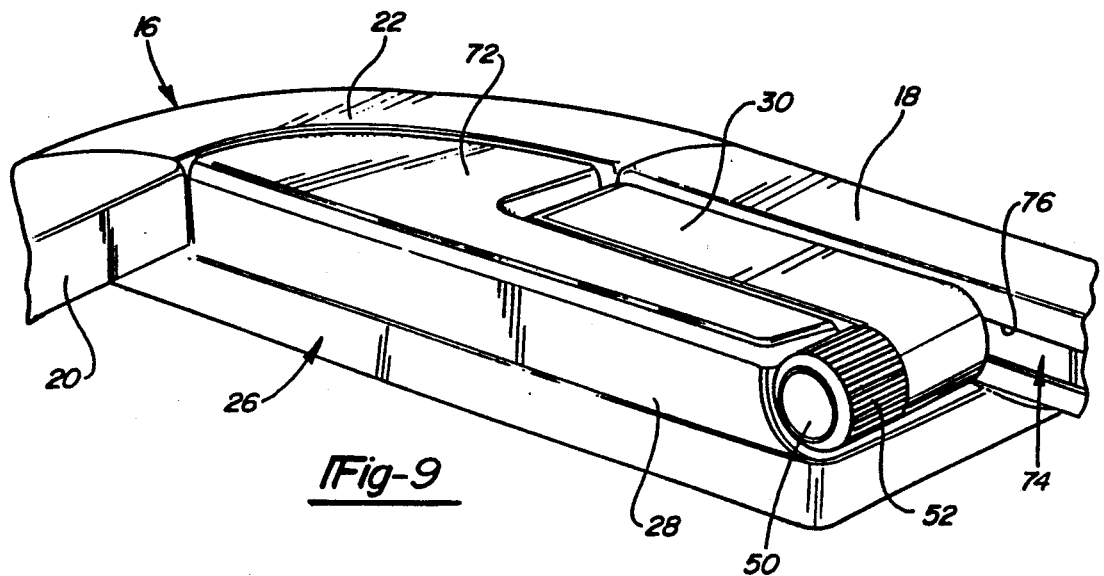
FIG. 9 is a perspective view of the support stanchion assembly of a second embodiment in the stored position.
Figure 10:
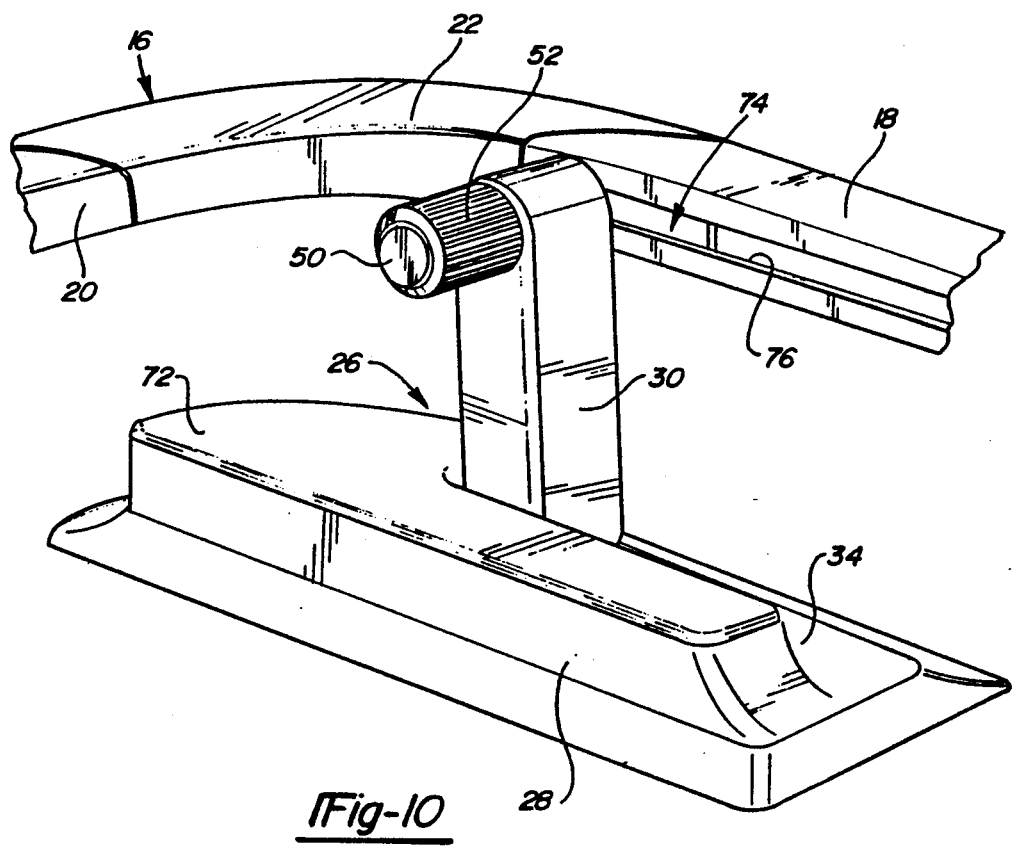
FIG. 10 is a perspective view of the support stanchion assembly of a second embodiment in the elevated position.

Referring first to FIGS. 1, 2 and 7, there are shown two embodiments of a vertically adjustable luggage carrier 10 of the present invention mounted to a surface 12 of a motor vehicle 14. The carrier 10 generally includes a peripheral frame 16 comprising a pair of side rails 18 and one or more cross rails 20 extending between the side rails 18. The cross rails 20 may be connected to the side rails 18 by corner member 22. To provide a load-bearing surface for articles within the carrier 10, a plurality of longitudinal slats 24 may be mounted to the vehicle surface 2 within the periphery of the frame 16. Although the frame 6 of the present invention is shown having a rectangular configuration with a pair of side rails 18 and two or more cross rails 20, it should be understood that the frame 16 may comprise any configuration which facilitates retainment of the load. Alternative frame configurations may include cross rails 20 alone or side rails 18 alone such that the load can be tied down and will be prevented from shifting during changes in acceleration of the vehicle 14.

The frame 16 of the carrier 10 is mounted to the vehicle surface 12 by a plurality of adjustable support stanchions 26. In a preferred embodiment of the present invention, the support stanchions 26 are pivotably adjustable to move the frame 16 between a lower or stored position (FIG. 1) and an elevated position (FIGS. 2 and 7) such that the frame 16 is in spaced apart relation to the vehicle surface 12 to facilitate retainment of articles within the carrier 10. The number of support stanchions 26 will depend upon the size and configuration of the frame 16 and its desired load-bearing capacity. A first embodiment of the support stanchion 26 is shown in FIGS. 1 through 6 while a second embodiment is shown in FIGS. 7 through 10. Both embodiments of the stanchion 26 allow simple adjustment of the carrier 10 between a stored and an elevated position.

The first embodiment of the support stanchion 26 shown in FIGS. 3-6 includes a stanchion base 28 and a pivotable arm 30. The base 28 is mounted directly to the vehicle surface 12 using a plurality of fasteners 32 and includes a first platform 34 to nestingly receive the pivot arm 30 and a second platform 36 to nestingly receive the frame 16 as will be subsequently described in greater detail. The base 28 also includes a male yoke portion 38 associated with the arm 30 receiving platform 34. A first end of the pivot arm 30 includes a female yoke portion 40 adapted to be pivotably connected to the yoke portion 38 of the base 28. A pivot pin 42 extending through the yokes 38 and 40 pivotably secures the arm 30 to the base 28. The base 28 further includes a slotted tang 44 associated with the base yoke portion 38. The slot 44 is adapted to releasably receive a snap bump 46 formed on the pivot arm 30 to retain the arm in its raised position as will be subsequently described.

Figure 3:
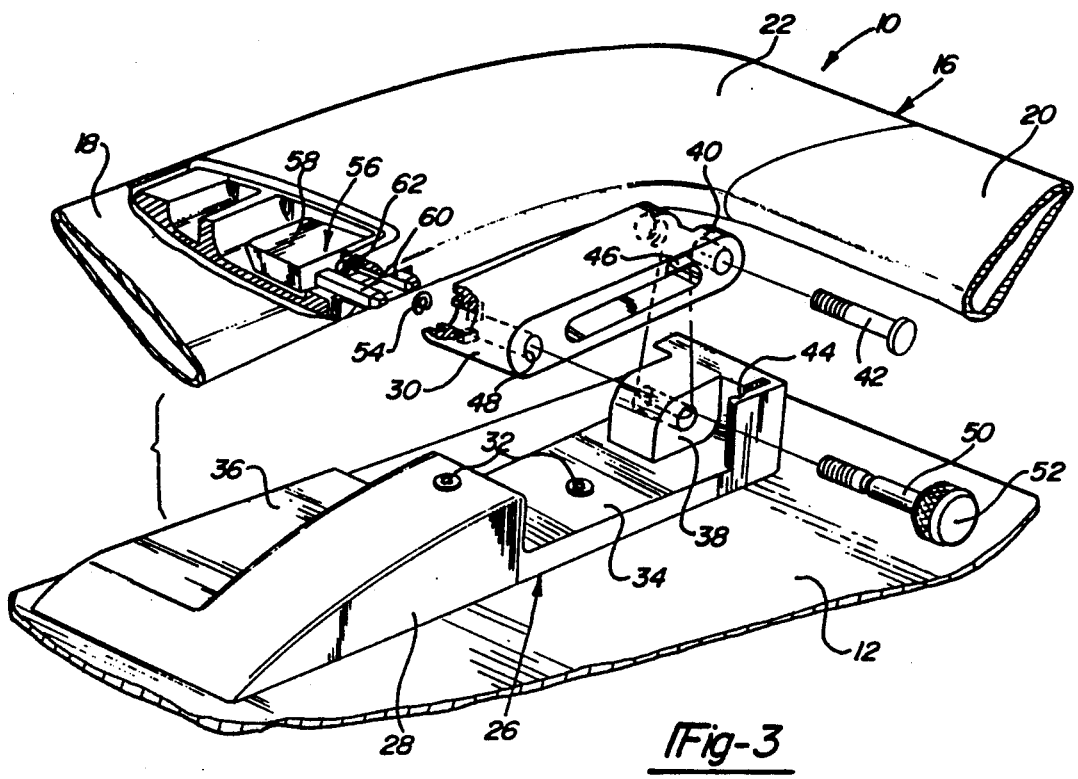
FIG. 3 is an exploded perspective of the support stanchion assembly of a first embodiment.
Figure 4:
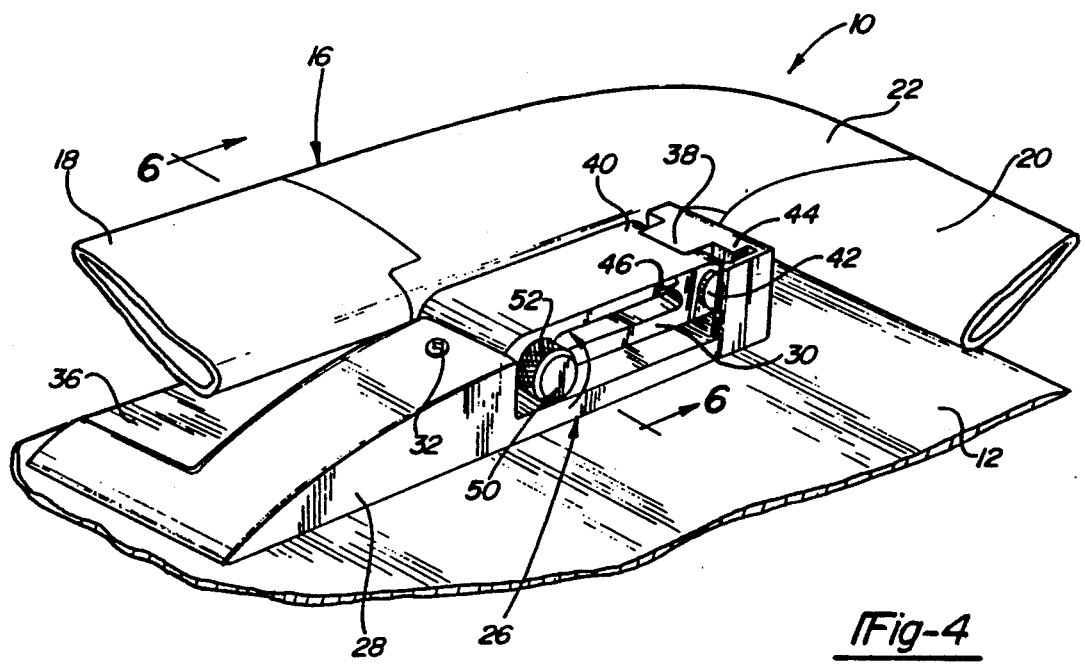
FIG. 4 is a perspective view of the support stanchion assembly of a first embodiment in the stored position.
Figure 5:
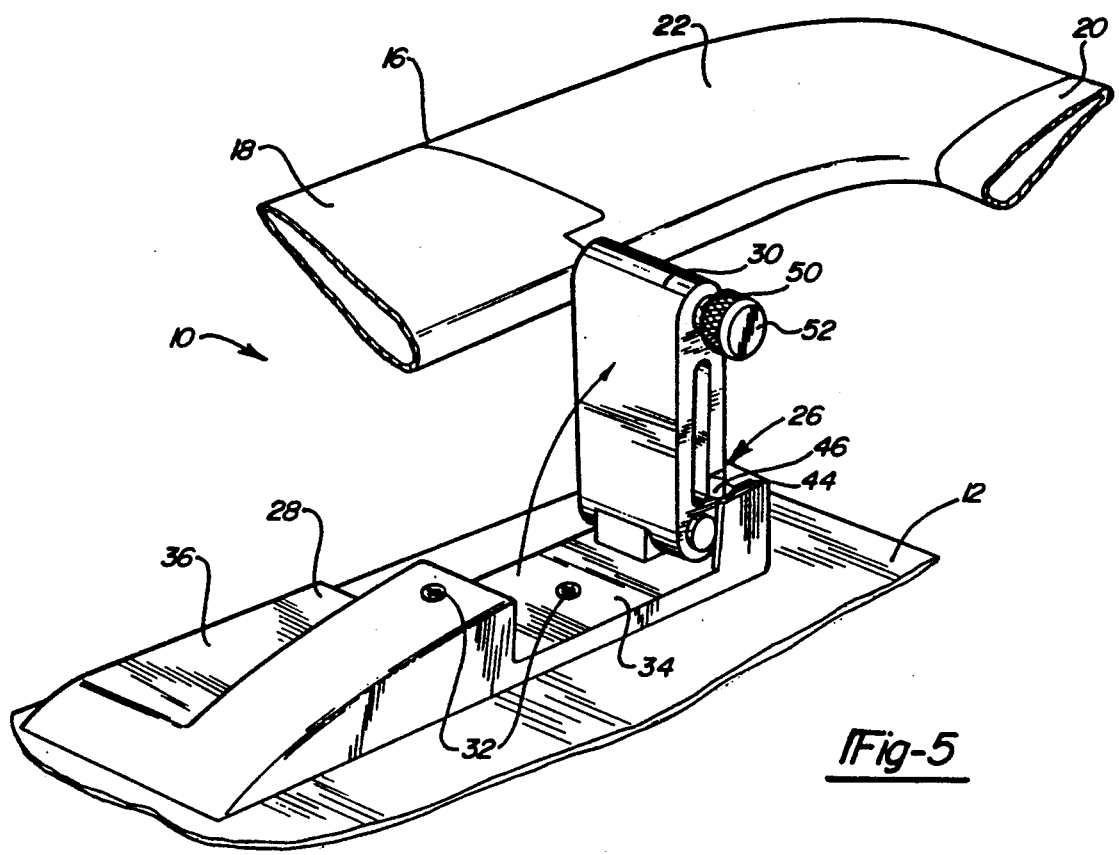
FIG. 5 is a perspective view of the support stanchion assembly of a first embodiment in the elevated position.
Figure 6:
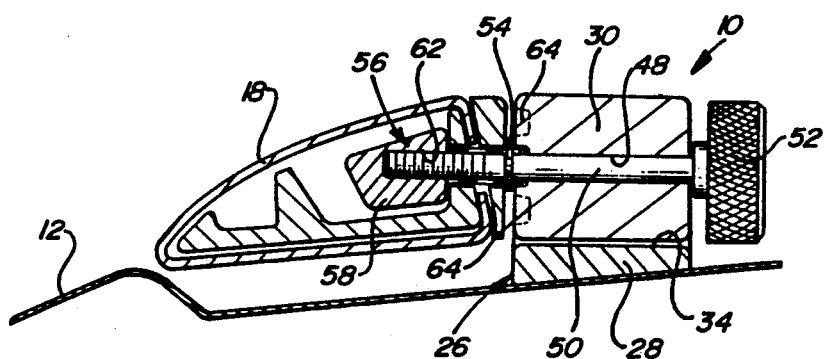
FIG. 6 is a cross-sectional perspective of the support stanchion taken along lines 6—6 of FIG. 4.

A second end of the pivot arm 30 is pivotably connected to the frame 16, preferably the side rail 18. The second end of the arm 30 is provided with a lateral throughbore 48 adapted to receive a locking bolt 50 which extends into the side rail 18 of the frame 16. The locking bolt 50 has a knob 52 for manual rotation thereof and is retained within the second end of the arm 30 by a retaining clip 54. The locking bolt 50 includes a threaded end threadably attached to a locking prong 56 positioned within the side rail 18 as shown in FIGS. 3 and 6. The locking prong 56 includes a body 58 and a pair of fingers 60 extending through the wall of the side rail 18. The body 58 has a threaded aperture 62 disposed between the fingers 60 to receive the threaded end of the locking bolt 50. Accordingly, as the locking bolt 50 is rotated in one direction the locking prong 56 will be drawn towards the pivot arm 30. Conversely, as the bolt 50 is rotated in the opposite direction the prong 56 will be forced away from the pivot arm 30. Spaced around the throughbore 48 of the arm 30 are two pairs of slots 64 to selectively receive the prong fingers 50 and lock the pivot arm 30 relative to the frame 16. One pair of slots 64 lockingly receives the locking prong 56 when the carrier 10 is in the lower stored position and the other pair of slots 64 lockingly receives the prong 56 when the carrier 10 is in the elevated position.

The second embodiment of the carrier 10 utilizes a modification of the support stanchion 26 to adjust the frame 16 between the lowered and elevated positions. The arm 30 is pivotably connected to the stanchion base 28 by pivot pin 42 which is disposed within a first end of the arm 30. A cover plate 20 attaches to one side of the arm 30 to hide the pin 42. Similarly, the stanchion base 38 includes a cover plate 72 to hide the fasteners 32 and the end of the pivot pin 42. The locking bolt 50 extends through bore 48 in the second of the pivot arm 30 to threadably engage a slider bar 74 slidably disposed within the side rail 18 of the frame 16. The side rail 18 of the second embodiment includes a longitudinal slot 76 formed on the inboard side of the rail 18 through which the threaded end of the locking bolt 50 extends to engage the slider bar 74. The slider bar 74 generally comprises a retaining frame 76 and a locking nut 78 positionally captured within the frame 76. The locking nut 78 includes a threaded aperture 80 adapted to threadably receive the threaded end of the locking bolt 50. Thus, as the bolt 50 is rotated in one direction the nut 78 will be drawn towards the pivot arm 30 to frictionally lock the slider bar 74 in position. Conversely, rotation of the bolt 50 in the other direction will release the locking nut 78 to facilitate sliding and pivotable movement of the arm 30 and slider bar 74.

Either embodiment of the carrier 10 provides vertical adjustment of the frame 16 between a stored position substantially flush with the vehicle surface 12 (FIG. 1) and an elevated position spaced apart from the vehicle surface 12 (FIGS. 2 and 7). When the frame 16 is lowered, the pivot arm 30 of the stanchion 26 will be nestably received by the base 28. To raise the frame 16, the individual locking bolts 50 are loosened by rotating the knob 52 counterclockwise. In the first embodiment, this will force the locking prong 56 outwardly withdrawing the fingers 60 from the horizontally oriented slots 64. In the second embodiment, the locking nut 78 will move out of frictional engagement. The frame 16 can now be raised by pivoting the arms 30 until they are vertical. As the arms 30 are moved towards the vertical position, the snap bump 46 will engage the slot 44 temporarily retaining the stanchion arm 30. Once all of the arms 30 are properly positioned, the locking means can again be engaged to secure the frame 16 in the elevated position. In the first embodiment, rotation of the bolt 50 clockwise will draw the locking prong 56 inwardly causing the fingers 60 to engage the other pair of slots 64 thereby preventing adjustment of the frame 16 relative to the stanchion 26. In the second embodiment, the locking nut 78 will be drawn into frictional engagement preventing movement of the slider bar 74. Because the bar 74 is slidably disposed the rail 18, the frame 16 of the second embodiment will travel along a true vertical path and cold be locked into position at any intermediate point, if desired. Thus, the embodiments of the present invention provide an adjustable article carrier 10 which may be stored in an aerodynamically advantageous and aesthetically appealing position when not in use yet may be quickly and simply moved to an operative position.

The foregoing detailed description has been given for clearness of understanding only and no unnecessary limitations should be understood therefrom as some modifications will be obvious to those skilled in the art without departing from the scope and spirit of the appended claims.

We claim:

1. An article carrier mountable to a vehicle surface, said carrier comprising:
   a frame having a pair of side rails for retaining articles within said carrier;
   a plurality of adjustable support stanchions mounted to the vehicle surface, said stanchions connected to said frame to selectively move said frame between a lower stored position substantially flush with the vehicle surface and an elevated position spaced apart from the vehicle surface; and
   means for selectively locking said adjustable support stanchions relative to the vehicle surface and said frame, said locking means includes a manually rotatably bolt extending through said stanchion into said frame and threadably attached to a connector bar slidably received within said side rail of said frame such that rotation of said bolt in a first direction to tighten said locking means draws said connector bar into frictional engagement with said side rail and rotation of said bolt in a second direction loosens said locking means to release said connector bar from said frictional engagement for selectively moving said frame.

2. The carrier as defined in claim 1 wherein said adjustable support stanchions include a stanchion base mounted to the vehicle surface and a pivot arm, a first end of said arm pivotably connected to said base and a second end of said arm pivotably connected to one of said side rails of said frame.

3. The carrier as defined in claim 2 wherein said stanchion base nestably receives said pivot arm when sad frame is lowered to its stored position substantially flush with the vehicle surface.

4. The carrier as defined in claim 2 wherein said manually rotatable bolt extends through said pivot arm into said frame to engage said connector bar.

5. The carrier as defined in claim 1 and further comprising detent means for retaining said pivot arm in the elevated position.

6. An article carrier mountable to a vehicle surface, said carrier comprising:

a peripheral frame for retaining articles within said carrier, said frame selectively adjustable between a lower stored position substantially flush with the vehicle surface and an elevated position spaced apart from the vehicle surface;

a plurality of adjustable support stanchions mounted to the vehicle surface and connected to said frame, said support stanchions including a stanchion base mounted to the vehicle surface and a pivot arm, a first end of said arm pivotably connected to said base and a second end of said arm pivotably connected to said frame whereby pivotable adjustment of said arm will move said frame between said lowered and elevated positions; and means for selectively locking said pivot arm of said adjustable support stanchions relative to said frame and the vehicle surface preventing vertical adjustment of said frame, said locking means including a manually rotatable bolt extending through said pivot arm into said frame and threadably attached to a connector bar assembly disposed within said frame such that rotation of said bolt in a first direction to tighten said locking means draws said connector bar into frictional engagement with said frame and rotation of said bolt in a second direction loosens said locking means to release said connector bar for selectively moving said frame.

* * * * *